Sept. 21, 1954  W. C. BARNES ET AL  2,689,940
FLAW DETECTION APPARATUS
Filed March 2, 1949  2 Sheets-Sheet 1
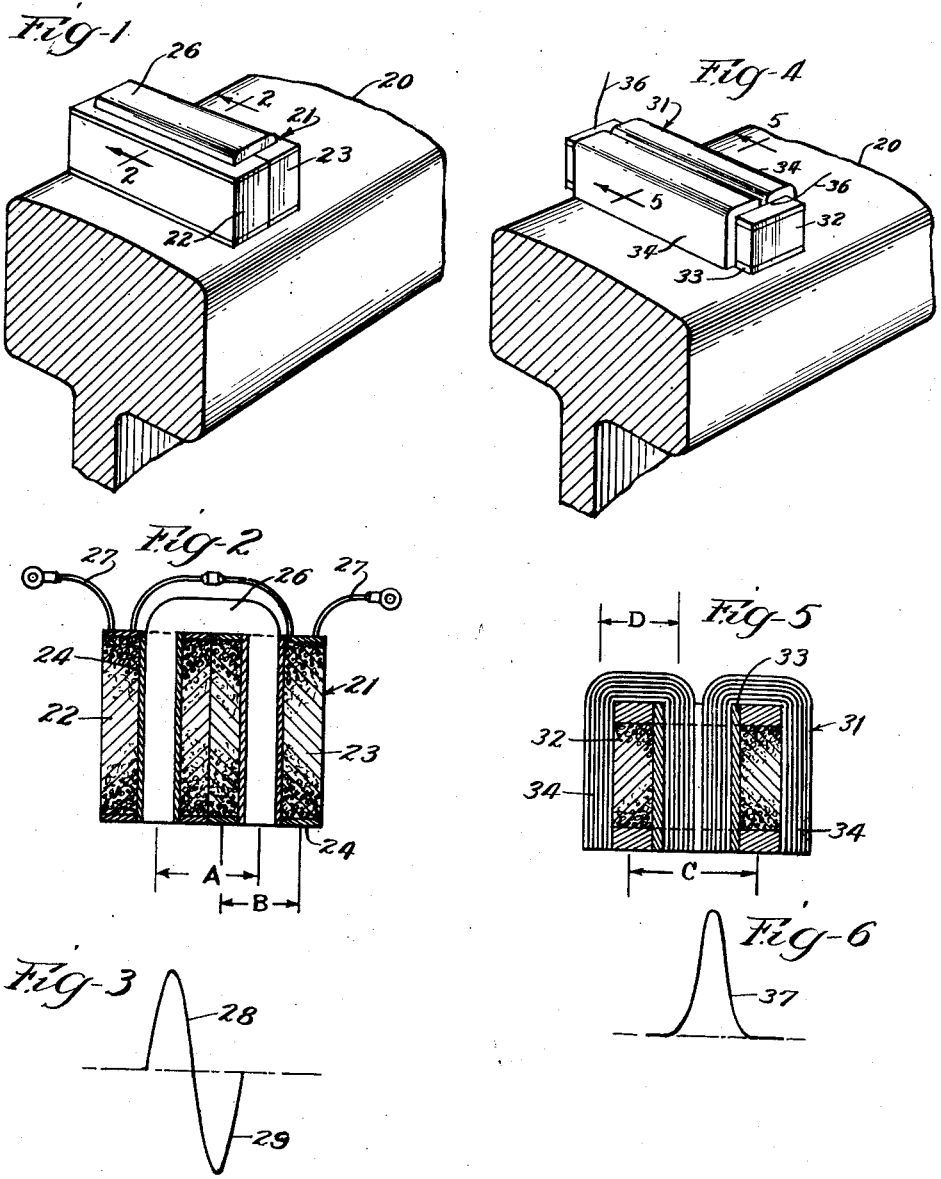

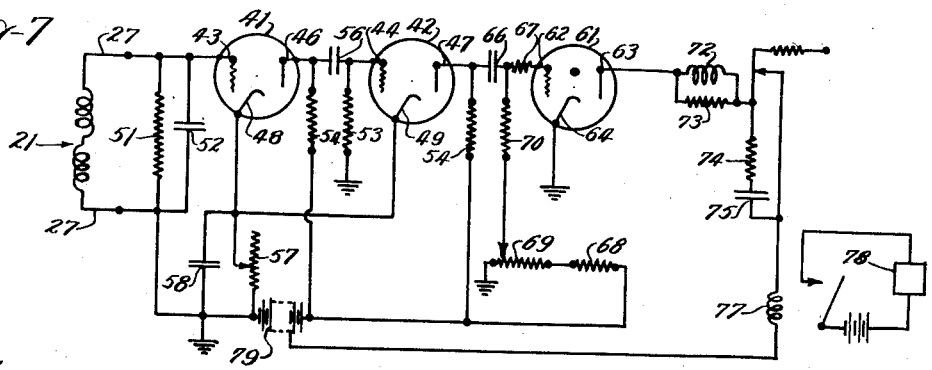

Patented Sept. 21, 1954

2,689,940

UNITED STATES PATENT OFFICE 2,689,940

FLAW DETECTION APPARATUS

Walter C. Barnes, Lake Bluff, and
Henry W. Keevil, Evanston, Ill.

Application March 2, 1949, Serial No. 79,246

6 Claims. (Cl. 324—37)

In the detection of flaws in rail, it is necessary to provide detecting equipment that will function with a high degree of accuracy to detect the minute, characteristic magnetic fields about even very small fissures and differentiate them from the numerous other magnetic fields about inconsequential defects such as burns, gags, etc., not only when the magnetic fields are well separated, but also when the characteristic flaw field is almost obscured by a larger magnetic field such as is encountered at the ends of rail where the fields about the rail ends, joint bars, and bolt holes are very strong in comparison to that about the flaw. Such fields tend to obscure the flaw field so that the pickup cannot ascertain in terms of the output signal that a flaw is present, and in addition these stronger fields produce such a strong output signal from the pickup as to "paralyze" the amplifier and prevent it from indicating the receipt of a flaw signal until considerably after the pickup has passed the point at which the excessively strong signal was produced.

The present invention seeks to solve these problems, and does solve them, by providing an amplifier of novel construction—one which is particularly effective when used with a pickup of the type disclosed in the copending application of John C. Dionne, Serial No. 59,955, now Patent No. 2,602,108, the disclosure of which is incorporated herein by reference. The principles of the new amplifier are equally applicable to, and will improve the results obtained with, other types of pickups. With a small pickup of the type referred to, excellent record discrimination is obtained between flaws and inconsequential defects. The amplifier does not become paralyzed as a result of the excessively strong magnetic fields about rail ends. In fact, during actual testing operations flaws have been found within the joint bars and within a few inches of the end of a rail.

A "positive" feedback circuit in the amplifier results in adequate amplifier gain to record relatively weak flaw signals without requiring a large number of amplifier stages. The strength of excessively strong input signals, such as those produced by the magnetic field about a joint, are limited to a strength not much in excess of that of an amplified flaw signal. One of the principal operational characteristics of the amplifier is the remarkably linear output signal strength despite the disparity that may exist between the strength of the input signals. Furthermore, the "positive" feedback is obtained without causing any instability (oscillation) of the amplifier.

The amplifier is remarkably sturdy and remains unaffected by jolts and jars that in many cases cause erratic operation of an amplifier. The operation of the amplifier is readily "standardized" before it is sent to the field, and thereafter the only adjustment that need be made is the regulation of sensitivity to meet the conditions under which the detector car is to be operated, which adjustment is readily accomplished by means of a single control knob.

Additional objects and advantages will be apparent from the following descriptions taken in conjunction with the drawings, in which:

Fig. 1 is a perspective view of a double coil pickup particularly suitable for use with the amplifier of this invention;

Fig. 2 is a section taken at line 2—2 of Fig. 1;

Fig. 3 is a diagram of the type of fissure signal produced by the pickup of Fig. 1;

Fig. 4 is a perspective view of a single coil pickup that may also be advantageously used in the practice of this invention;

Fig. 5 is a section taken at line 5—5 of Fig. 4;

Fig. 6 is a diagram of the type of fissure signal produced by the pickup of Fig. 4;

Fig. 7 is a schematic diagram of an amplifier embodying the present invention;

Figs. 8 through 12 inclusive are diagrams illustrating the shape of the signal at various points in the amplifier of Fig. 2 when a sine wave input signal is used; and Figs. 13 through 18 inclusive are diagrams illustrating the shape of the signal at various points in the amplifier when a square wave input signal is introduced.

When an elongated metallic body, such as rail 20, is energized, either with current or magnetic flux, characteristic magnetic fields are found about the rail adjacent to the fissures that may be present therein. The term "fissure," as used in this specification and the appended claims, includes not only those cleavages which originate internally of the rail, but also those which may originate on the surface of the rail, usually called "detailed fractures." These are differentiated from "non-fissure" defects which are harmless, such as burns, gags, corrugations, etc.

As is well known, when a conductor is passed through a magnetic field, a voltage is generated in the conductor. One of the principal problems in the detection of fissures in rail is to discriminate between the characteristic magnetic fields about a fissure and those about non-fissure defects. This problem involves two main parts. The first part of the problem is to produce a voltage signal, when the conductor (the pickup)

passes through the characteristic field of a fissure, that is different from that produced when traversing a non-fissure field, so that it is possible for an amplifier to differentiate between the two signals. The second part of the problem is to provide an amplifier that will differentiate between the various signals produced by the pickup. The small pickups of Figs. 1 and 4 are ideally suited for solving the first part of the problem.

The pickup, generally 21, of Figs. 1 and 2 comprises a pair of coils 22 and 23 wound on non-magnetic bobbins 24. Each coil is approximately 10,000 turns of #42 enameled wire. An inverted U-shaped core 26 of highly permeable material interconnects the two coils 22 and 23, with the two legs of the core extending into the central openings of the two bobbins 24. The windings of the two coils 22 and 23 are wired in series opposition with external leads 27 provided for connection with the amplifier.

The mean width between the two legs of U-shaped core 26, as illustrated by the dimension A in Fig. 2, is preferably about $\frac{7}{16}$ of an inch. The mean width of each of the coils 22 and 23, the dimension B in Fig. 2, is substantially $\frac{3}{32}$ of an inch. Upon traversing the magnetic field about a fissure, such a pickup will produce a signal which is substantially a sine wave consisting of a positive pulse 28 and a negative pulse 29, as illustrated in Fig. 3.

With a given magnetization of the rail the polarity of the initial pulse will always be the same. This may be referred to by saying that the phase of the wave of the pickup will be the same. Of course, the polarity of the initial pulse as transmitted to the amplifier may be reversed (changed by 180°) by reversing the connections of leads 27 to the amplifier.

Figs. 4 and 5 illustrate a small, single coil pickup, generally 31, which consists of a coil 32 wound on a non-magnetic bobbin 33 and a pair of inverted U-shaped cores 34, each having one leg projecting within the central opening of bobbin 33 and the other leg projecting downwardly on the side of coil 32. Preferably the mean width between the sides of the coil windings, the dimension C in Fig. 5, is approximately $\frac{7}{16}$ of an inch, and the distance D, the mean width between the legs of each of cores 34, is approximately $\frac{3}{32}$ of an inch. The coil 32 consists of approximately 10,000 turns of #42 enameled wire. Two external leads 36 are provided from coil 32 to connect the pickup to the amplifier.

Pickup 31 produces a single polarity signal 37 (Fig. 6) upon traversing the magnetic field about a fissure. With a given rail magnetization the polarity of the pulse upon traversing the fissure field will always be the same. As seen at the amplifier, the polarity of the pulse may be either positive or negative, depending upon the connection of leads 36.

Fig. 7 is a schematic diagram of an amplifier embodying the present invention. For the purpose of disclosure, a preferred form will be specifically described, but it should be understood that specific values for the components thereof are merely illustrative. Basically the amplifier is a two-stage resistor and capacitor coupled amplifier, followed by a stage incorporating a "trigger tube" to insure positive operation of a relay in response to signals in excess of a predetermined minimum strength. The amplifier is responsive to a single polarity which allows it to be used with either a double polarity or a single polarity pickup. Each of the first two stages incorporates an electron valve 41 and 42 respectively, each having control element 43 and 44 respectively, an anode 46 and 47 respectively, and a cathode 48 and 49 respectively.

The term "electron valve" is used herein to include not only the well known tubes having evacuated or gas-filled chambers, but also other devices which will perform similar functions. For example, in place of the vacuum tube of three elements, i. e., a cathode, an anode, and a control element or grid, it may be possible to substitute a crystal of germanium or other material in which the current flow between a cathode and an anode may be changed by varying the potential on a control element in a manner similar to that in which the control grid of a vacuum tube changes the current flow between the cathode and anode (plate) of the latter device. Such crystals have been termed "transistors."

The leads 27 of pickup 21 are connected across control element 43 of the first amplifier stage and a point of common negative potential (ground). Inasmuch as pickup 21 produces substantially a sine wave, the polarity of the connections is not critical. If pickup 31 is used, the leads 36 must be connected so that the pulse 37 is impressed upon the control element 43 as a positive polarity pulse.

The control element of the first valve is biased to ground through a resistor 51 having a value of 4700 ohms, which is connected in parallel with a capacitor 52 having a value of 0.05 microfarad and is parallel with the pickup. The control element of the second valve 42 is biased to ground through a resistor 53 having a value of 100,000 ohms. The load resistor 54 of each of valves 41 and 42 is 100,000 ohms. A coupling capacitor 56 of 0.01 microfarad is used between the first and second stages. The cathodes 48 and 49 are biased to ground through a common cathode resistor 57, which resistor is a non-inductive, variable resistor having a total value of 500 ohms, although the actual value used is somewhat less than this, as will hereinafter be explained. A common cathode by-pass condenser 58 is connected in parallel with resistor 57 and is an electrolytic capacitor having a nominal value of 15 microfarads.

The valve 61 of the third stage is a thyratron (gas filled tube) having a control element 62, an anode 63 and a cathode 64. The signal from the anode 47 of valve 42 is fed to valve 61 through a coupling capacitor 66 having a value of 0.05 microfarad and a one megohm resistor 67. The control element 62 of the thyratron is biased from a voltage divider connected across the power supply and consisting of a 39,000 ohm resistor 68 and a 25,000 ohm potentiometer 69 in series, the movable contact of the potentiometer being connected to resistor 67 through a 470,000 ohm resistor 70. In this way the potentiometer serves as a "fire control," variable bias means to adjust the firing or threshold point of the gas filled tube 61 in response to a signal and prevents the tube from firing unless a signal equal to, or greater than, a predetermined minimum strength is received.

The coil 72 of a normally closed relay is connected in the anode circuit of valve 61, with the relay contacts in series therewith to serve as a method of quenching the thyratron tube. The relay used in the specific embodiment described is a Sigma 4R2500S. A 1000 ohm resistor 73 is connected in parallel with relay coil 72 to slow down the action of the relay, and a 50 ohm resistor 74 in series with an 0.5 microfarad capacitor 75 is connected in parallel with the relay contacts.

Also in series in the anode circuit of the thyratron 61 is coil 77 of a normally opened relay to actuate a suitable recording device 78 in a well known manner.

A power supply is used, such as battery 79, which will supply 180 volts for stages 1 and 2 and 150 volts on the tap connected to one side of coil 77. Valves 41 and 42 are each a 6Q7, and valve 61 is a 1C21.

The operation of the amplifier, as illustrated by Figs. 8 through 18 inclusive, may be better understood if the unique interaction between valves 41 and 42 is first discussed. This interaction is a result of the common cathode biasing of the valves 41 and 42 through resistor 57 connected in parallel with capacitor 58. Normally the cathode biasing of a valve has a degenerative effect upon that valve which causes a leveling-out of the tube characteristic curves, the reason for this being that the IR drop across the cathode resistor as a signal is impressed upon the control element of the valve will vary in such a manner so as to oppose the change in control element to cathode potential resulting from the imposition of an external signal on the control element. A further explanation of this action will be found in "Experimental Electronics," by Muller et al., pages 38 et. seq. However, with a common cathode resistor, such as 57 of Fig. 7, a change in a cathode current flow in either valve 41 or valve 42 will not only change the potential of the cathode of one valve but will also change the potential of the cathode of the other valve, causing a novel interaction in the signal response characteristics of the two valves.

The phase of a given signal between two adjacent stages of a resistance-capacitance coupled amplifier, in which the coupling is between anode and control element as in Fig. 7, changes substantially 180° from the control element of the first valve to the control element of the second valve. Therefore while the effect of cathode biasing upon the cathode to grid potential of the valve whose control element is being varied is degenerative (or out of phase), the change in potential of the cathode of the second valve (resulting from the cathode current change in the first valve) is in phase (regenerative) with the change impressed upon the control element of the second valve from the anode of the first valve. The cathode current change in the second valve will have a similar regenerative effect upon the signal in the first valve and is referred to as a "positive" feedback.

The term "in phase," when used in connection with the separate voltage changes on the control element and on the cathode, means that these voltages are additive in their effects; while if they are "out of phase," the effect of one voltage tends to cancel the effect of the other. The term "positive" is used to indicate that the feedback is substantially in phase, as differentiated from the term "negative" feedback when it is out of phase.

While the action resulting from the common cathode biasing of the two cascade stages is inextricably interwoven, it may be, for the purposes of generalization, broken down into four separate effects. (1) The degenerative effect of the change in cathode current flow in the first valve upon the grid to cathode voltage in that valve. (2) The "positive" feed from cathode to cathode of the two valves resulting from the change in cathode current flow in the first valve. (3) The degenerative effect upon the grid to cathode potential in the second valve resulting from changes in cathode current flow in the second valve. (4) The regenerative or "positive" feedback from cathode to cathode resulting from a change in the cathode current flow in the second valve. While all four of these effects are present, it is the fourth that predominates and is a large factor in the improved results obtained with the amplifier.

The reason why the fourth effect predominates is due to the fact that the total change in cathode current flow in response to a given signal is much greater in the second valve than it is in the first valve. Any instantaneous signal change upon the control element of the first valve is amplified therein and transmitted from the anode to the control element of the second valve as a much stronger signal. The reaction in the second valve will be greater due to the fact that a stronger signal is impressed upon the grid thereof, and, with a given instantaneous signal change upon the control element of the first valve, a greater change in cathode current flow will be experienced in the second valve than is found in the first valve, and the net change in the IR drop in the cathode resistor will be primarily due to the cathode current change in the second valve.

Keeping in mind that in response to a given input signal the signal strength on the control element of the first valve and the cathode current change in the first valve are relatively small and that both are relatively large in the second valve, one should now refer back to the four effects previously listed.

*Effect No. 1.—Degenerative effect on grid to cathode potential in the first valve due to the change in cathode current flow in first valve.—* The signal imposed upon the first grid is relatively weak, and since the change in cathode current flow is relatively weak, the "negative" change in cathode potential will be relatively small. Therefore the net result of this effect will be only nominal.

*Effect No. 2.—Change in grid to cathode potential of second valve as a result of change in cathode current flow in the first valve.—*The signal imposed on the grid of the second valve is relatively large, and the "positive" change in cathode potential is relatively small because of the relatively small change in cathode current flow in the first valve. Therefore the net result of this effect will be negligible.

*Effect No. 3.—Change in grid to cathode potential in second valve resulting from change in cathode current flow in second valve.—*The signal imposed upon the grid of the second valve is relatively large, while the "negative" change in cathode potential of the second valve is also relatively large because of a relatively large change in cathode current flow in the second valve. Therefore the net degenerative effect upon the second valve is only nominal.

*Effect No. 4.—Change in grid to cathode potential of first valve resulting from change in cathode current flow in the second valve.—*The signal imposed upon the grid of the first valve is relatively small, while the "positive" change in cathode potential is relatively large due to the relatively large change in cathode current flow in the second valve. Therefore the net result of this effect is relatively large.

While each of these four effects is present and will be a contributing factor in the action of the amplifier, the fourth is so predominant that it alone can be said to determine the amplifier action.

Figs. 8 through 11 inclusive illustrate the wave shape on the control elements and anodes of valves 41 and 42 when a sine wave having a strength approximately equal to the signal strength caused by an 80 per cent fissure is introduced at the input of the amplifier. It must be borne in mind that these figures do not show the comparative strength of the signals on the grids and plates. Actually the signal becomes much stronger as it proceeds through the amplifier; and if this were represented, the height of the signal from the base line (amplitude) would be greatly increased in succeeding figures. In each instance the signal was taken from the control element or anode, as the case may be, with respect to ground.

Fig. 8, which illustrates the signal on the control element of valve 41, shows the typical sine wave shape which was used for the input signal. Fig. 9 illustrates the same signal appearing on the anode 46 of valve 41. Two changes will be noted in the signal as a result of its passing through the valve, the first change being the 180° phase reversal, and the second being the increased size of the pulse which was of positive polarity on the control element 43 and appears as a negative pulse on anode 46 in respect to the size of the following pulse of opposite polarity. The broken line of Fig. 9 illustrates what would be the size of this pulse if it were only amplified to the extent illustrated by the pulse which was negative on the control element 43.

The increase in size is due to the positive feedback from the common cathode biasing of the two valves. It would seem that this feedback should also be apparent in the pulse that was negative on the control element 43, but this does not occur (as is shown in reference in Figs. 15 and 16), and the reason will be apparent from a study of Figs. 10 and 11.

Fig. 10 illustrates the same signal on the control element 44 of valve 42, and Fig. 11 illustrates the signal on anode 47 of valve 42. Valves 41 and 42 are biased relatively close to the saturation point of the tube characteristic curves. With signals of a strength not excessively greater than that produced by even large fissures, that factor has little effect on valve 41 because of the fact that the incoming signals are so relatively weak on the control element of valve 41 that they do not begin to swing the control element of that valve to the saturation point or to a point where the control element begins to draw current.

However, on valve 42 the signal is much stronger due to the amplification in valve 41, and a positive impulse on control element 44 (of a strength approximately that from a fissure) is sufficient to swing the control element to the point where the control element commences to draw current. This is illustrated by comparison of Figs. 9 and 10. After the signal of Fig. 9 is transmitted through coupling capacitor 56, the positive pulse at that point is of reduced size and has a definite flat top. Thus the positive pulse was sufficiently strong to swing control element 44 to where grid current was being drawn and limiting the strength of the signal which could be impressed upon that control element. Since the strength of the positive pulse at that point was being limited, the amount of cathode current change was also limited, and the change was not sufficient to cause a noticeable positive feedback into the first valve 41 (at least, any positive feedback from the negative incoming pulse is quite small in comparison to the positive feedback from the positive incoming pulse).

The signal appearing on the anode 47 of the second valve is substantially the same as that appearing on the grid of that valve, except that the strength is much greater and the phase of the signal has been changed by 180°.

Fig. 12 illustrates the wave shape on anode 47 of valve 42 when a sine wave, such as that of Fig. 8, is introduced into the input of the amplifier with the strength of the input signal approximately double that produced by an 80 per cent fissure. It will be noted that the top of the positive pulse of Fig. 12 (being also the positive input pulse) is cut off, indicating that a limiting effect is being found with input signals of approximately that strength. With the same input signal the wave shape on the control element and anode of the first valve and the control element of the second valve is substantially the same as those shown in Figs. 8, 9 and 10 respectively. Thus the limiting is occurring in the second valve. Apparently a signal of that strength is sufficient to swing the control element of valve 42 to the negative cut-off point of the tube characteristic curve, resulting in a limiting of any signals equal to, or greater than, that strength.

Figs. 13 through 18 inclusive illustrate the wave shape at various points in the amplifier when a substantially square wave signal is introduced into the input of the amplifier. While the action of the amplifier to such a signal is different in some respects than it is when a sine wave input is used, it is believed that the illustrations showing the results of such a test will aid in the understanding of the action of the amplifier. The signal frequency in Figs. 13–18 is substantially the same as that produced by pickup 21 when traveling along the rail at approximately 5 miles per hour, as was the frequency of signals shown in Figs. 8 through 12.

Fig. 13 shows the signal as taken across the control element 43 and ground and is the substantially square wave input signal which was being introduced. Fig. 14 illustrates the signal found on control element 43 with respect to cathode 48. It will be noted that a large hump has been added to the original signal. Fig. 15 illustrates the signal found on cathode 48 with respect to ground and shows the same hump except for the reversed polarity. The hump is the feedback from valve 42 because of the change in current flow through cathode resistor 57. It represents the sum of the effects 1 to 4 previously listed, but is predominately due to effect 4. It will be noted that the bottom side of the signal remains flat (within the range of observation), indicating that on negative input pulses the feedback is substantially non-existent.

Fig. 16 illustrates the signal on the anode 46 with respect to ground; Fig. 17 represents the signal on control element 44 with respect to ground; and Fig. 18 represents the signal on anode 47 with respect to ground. Fig. 17 again shows the limiting effect on the negative incoming pulse. As the positive surge from the end of the hump to the top of the square wave (Fig. 16) was transmitted through coupling condenser 56, control element 44 was only able to go in a positive direction a short distance before it apparently began drawing grid current, resulting in a very definite limiting of the positive pulse at that point (negative incoming pulse). Anode 47 (Fig. 13) again shows the limiting of the positive incoming pulses found in Fig. 12.

While the value of cathode resistor 57 has a very determinative effect upon the action of valves 41 and 42 and the feedback found therein, by-pass capacitor 58 also plays a very important part in the action of the amplifier. If this capacitor is not present or if it is of too small a value, the feedback will cause the amplifier to be unstable. If the size of the capacitor 58 is below approximately 10 microfarads, resistor 57 may not be much larger than about 60 to 90 ohms (depending upon the specific value of the capacitor) without resulting in a high frequency oscillation, and even under these conditions, a slight mechanical disturbance may cause the amplifier to start to oscillate. The use of capacitors of this value is undesirable because of this relative instability and also because the resistor is, of necessity, reduced to such a small size that the desired limiting and feedback of signals is not adequately obtained.

With a capacitor 58 of 10 microfarads or greater the amplifier is exceedingly stable through a range of values of cathode resistor 57, much in excess of the range preferably used to obtain proper limiting and feedback action from the amplifier. With the specific amplifier of Fig. 7 an electrolytic capacitor having a nominal value of 15 microfarads is used for capacitor 58. The actual value of the capacitor may vary from the rated or nominal value to a considerable extent although the actual value should not be less than about 10 microfarads.

A further advantage is obtained in that capacitor 58, in conjunction with capacitor 56, acts to tune the amplifier to provide the greatest amplification with incoming signals having a frequency about that of fissure signals. Condenser 58 acts as a by-pass to prevent the feedback of signals having a frequency substantially higher than that of a fissure signal. Any feedback signal voltages generated across resistor 57, which signal voltages are of a frequency about that of a fissure signal, are not by-passed out but act to reinforce the effect of the incoming signal upon control element 43.

Coupling condenser 56, on the other hand, is of a sufficiently small capacitance so as to effectively transmit from the first stage to the second stage only those signals which have a frequency substantially equal to, or greater than, the frequency of a fissure signal. Thus by its blocking effect on low frequency signals, coupling capacitor 56 serves to attenuate signals having a frequency substantially less than that of fissure signals.

The combined effect of capacitor 56 which serves to attenuate low frequency signals, and capacitor 58 which serves to by-pass the feedback of high frequency signals, is to make the amplifier most responsive to those signals of a frequency substantially equal to the frequency of a fissure signal. Thus the amplifier is better able to discriminate between fissure signals and those from burns, etc. which are often of a higher frequency or at least have high frequency components, and also discriminate against low frequency signals which may be produced in the pickup from non-fissure defects.

A simple method of standardizing the amplifier is used before it is placed into service to insure its proper operation. Fire control potentiometer 69 is adjusted to the midpoint of its range. A standard 20 per cent fissure signal is then applied to the input of the amplifier with bias resistor 57 set at the negative end of the bias (minimum resistance). Bias resistor 57 is then adjusted by increasing bias (increasing the resistance) until the threshold of the thyratron (the firing point) is reached for the given 20 per cent fissure signal. Bias resistor 57 is then "sealed" to prevent any accidental or intentional tampering with this standardized setting.

It will be seen that this method of adjustment not only corrects for deviations from the nominal or rated value of the components in the first two stages, but will also make a similar correction for the thyratron and associated parts. While the quantitative amount of feedback and limiting will not be exactly the same for each amplifier, it will be approximately the same and the overall sensitivity will be exactly the same. In actual testing operations any variations in the desired detection sensitivity are made by means of fire control potentiometer 69, which is usually mounted to be accessible from the front of the amplifier.

In utilizing the amplifier and pickup it is often desirable to run two pickups in tandem, maintaining sufficient spacing between the two pickups so that there will not be any interaction between them. The two pickups are connected to separate amplifiers, with a fire control potentiometer 69 of one of the amplifiers set so as to maintain a relatively high sensitivity and the other amplifier set to maintain a somewhat lower sensitivity. Such procedure will aid the operator in differentiating between fissure defects and non-fissure defects which may be of the nature to produce a signal substantially identical with that of a fissure defect, and at the same time further insuring that a fissure is not overlooked, because from casual observation it might have appeared to have come from an observable non-fissure defect. Obviously the two amplifiers may be connected to a single pickup, if desired.

The choice of particular components of the invention for specific illustration and description is merely a compliance with Section 4888 of the Revised Statutes, and should not be construed as imposing unnecessary limitations on the appended claims.

We claim:

1. In a device for the detection of flaws in an energized metallic body, the combination of an inductive pickup having poles spaced lengthwise of the body and spaced apart not more than substantially $\frac{1}{16}$ of an inch, which pickup is moved at a substantially given rate of speed along said body to produce signals of substantially a given frequency upon traversing the characteristic magnetic field about the flaw, and an amplifier including a pair of electron valves connected in cascade, each of said valves having a cathode, an anode, and a control element, resistor and capacitor coupling between the anode of the first of the said valves and the control element of the second of said valves, said capacitor being of sufficiently small capacitance to attenuate the signals between the anode of the first valve and the control element of the second valve when said signals are of a frequency substantially lower than said given frequency, a common cathode bias resistor for said two valves, a capacitor connected in parallel with said resistor, said capacitor being of a sufficiently large value to by-pass all signals of a frequency substantially greater than that of said given frequency.

2. In the detection of flaws in an energized metallic body, the combination of an inductive pickup having poles spaced lengthwise of the body and spaced apart not more than substantially $\frac{7}{16}$ of an inch, which pickup is adapted to be moved at substantially a given rate of speed along said body to produce a positive polarity impulse signal of substantially a given frequency on traversing the characteristic magnetic field about said flaw and an amplifier including a pair of electron valves, each of said valves having a cathode, an anode, and a control element, said impulse being impressed upon the control element of the first of said valves as a positive polarity signal, resistor and capacitor coupling between the anode of the first of said valves and the control element of the second of said valves, said capacitor being of sufficiently small value to attenuate signals between said anode and control element when said signals are of a frequency substantially less than said given frequency, a non-inductive common cathode bias resistor for said two valves, said resistor being of such a value as to bias the second of said valves adjacent the saturation end of the characteristic curve of the valve, a capacitor connected in parallel with said resistor, said capacitor being of sufficiently large value to by-pass signals of a frequency substantially greater than said given frequency.

3. The method of standardizing a flaw detection amplifier having at least two stages of amplification with the electron valves of said stages biased through a common cathode resistor followed by a stage incorporating a trigger tube having variable fire control means, including the steps of applying a standard signal to the input of said amplifier, setting the variable fire control means of said trigger tube at a given point in its range of values, and adjusting said common cathode resistor to the minimum bias at which the threshold of firing of said trigger tube is reached by said standard signal as transmitted through the amplifier to the trigger tube.

4. In a device for the detection of flaws in an energized metallic body, the combination of an inductive pickup having poles spaced lengthwise of the body and spaced apart not more than substantially $\frac{7}{16}$ of an inch, which pickup is moved at a substantially given rate of speed along said body to produce signals of substantially a given frequency upon traversing the characteristic magnetic field about the flaw, and an amplifier including a pair of electron valves connected in cascade, each of said valves having a cathode, an anode, and a control element, a coupling capacitor connected directly between the anode of the first of said valves and the control element of the second of said valves, a grid biasing resistor connected to the connection between said coupling capacitor and said control element of the second valve, said coupling capacitor being of sufficiently small capacitance to attenuate the signals between the anode of the first valve and the control element of the second valve when said signals are of a frequency substantially lower than said given frequency, a common cathode bias resistor for said two valves, and a by-pass capacitor connected in parallel with said common cathode bias resistor, said by-pass capacitor being of a capacitance substantially larger than the capacitance of said coupling capacitor, the capacitance of said by-pass capacitor being of a sufficiently large value to by-pass all signals of a frequency substantially greater than that of said given frequency, said cathode bias resistor being of a value to bias the valves adjacent the saturation end of the characteristic curves of the valves.

5. In a device for the detection of flaws in an energized metallic body, the combination of an inductive pickup having poles spaced lengthwise of the body and spaced apart not more than substantially $\frac{7}{16}$ of an inch, which pickup is moved at a substantially given rate of speed along said body to produce signals of substantially a given frequency upon traversing the characteristic magnetic field about the flaw, and an amplifier including a pair of electron valves connected in cascade, each of said valves having a cathode, an anode, and a control element, a coupling capacitor connected directly between the anode of said first valve and the control element of said second valve, a grid biasing resistor connected to the connection between said coupling capacitor and said control element of the second valve, said coupling capacitor being of a sufficiently small capacitance to attenuate the signals between the anode of the first valve and the control element of the second valve when said signals are of a frequency substantially lower than said given frequency, a common cathode bias resistor for said two valves whereby cathode current fluctuations in the second of the valves varies the biasing of the first of the valves causing a feedback from the second valve to the first valve, which feedback is substantially in phase with the signal impressed from the pickup on the control element of the first valve, and a by-pass capacitor connected in parallel with said common cathode bias resistor, the capacitance of said by-pass capacitor being of a sufficiently large value to by-pass all signals of a frequency substantially greater than that of said given frequency.

6. In a device for the detection of flaws in an energized metallic body, the combination of an inductive pickup having poles spaced lengthwise of the body and spaced apart not more than substantially $\frac{7}{16}$ of an inch, which pickup is moved at a substantially given rate of speed along said body to produce signals of substantially a given frequency upon traversing the characteristic magnetic field about the flaw, and an amplifier including a pair of electron valves connected in cascade, each of said valves having a cathode, an anode, and a control element, a coupling capacitor connected directly between the anode of the first of said valves and the control element of the second of said valves, a grid biasing resistor connected to the connection between said coupling capacitor and said control element of the second valve, a common cathode bias resistor for said two valves whereby cathode current fluctuations of the second of the valves causes a feedback from the second valve to the first valve, and a by-pass capacitor connected in parallel with said common cathode bias resistor, the capacitance of said by-pass capacitor being of sufficiently large value to by-pass all signals of a frequency substantially greater than that of said given frequency, said common cathode bias resistor being of a value to bias both of said stages relatively close to the saturation point of the characteristic curves of said valves, whereby effective feedback from the second valve to the first valve will be in phase with the portion of the signals to which the amplifier is to respond.

References Cited in the file of this patent

UNITED STATES PATENTS

| Number | Name | Date |
|---|---|---|
| 1,481,284 | Deardorff | Jan. 22, 1924 |
| 1,967,812 | Drake | July 24, 1934 |
| 2,055,672 | Roop | Sept. 29, 1936 |
| 2,068,112 | Rust | Jan. 19, 1937 |
| 2,313,098 | Shepard, Jr. | Mar. 9, 1943 |
| 2,461,253 | Barnes et al. | Feb. 8, 1949 |
| 2,559,515 | Pourciau | July 3, 1951 |

FOREIGN PATENTS

| Number | Country | Date |
|---|---|---|
| 148,582 | Great Britain | Aug. 5, 1920 |

OTHER REFERENCES

RCA Receiving Tube Manual. Copyright, 1940, RCA Mfg. Co. Inc. Technical Series No. RC–14, p. 213, the 6SN7 tube and its circuitry.